J. H. KOONS.
FURNACE.
APPLICATION FILED FEB. 5, 1910.
980,424.
Patented Jan. 3, 1911.
3 SHEETS—SHEET 1.
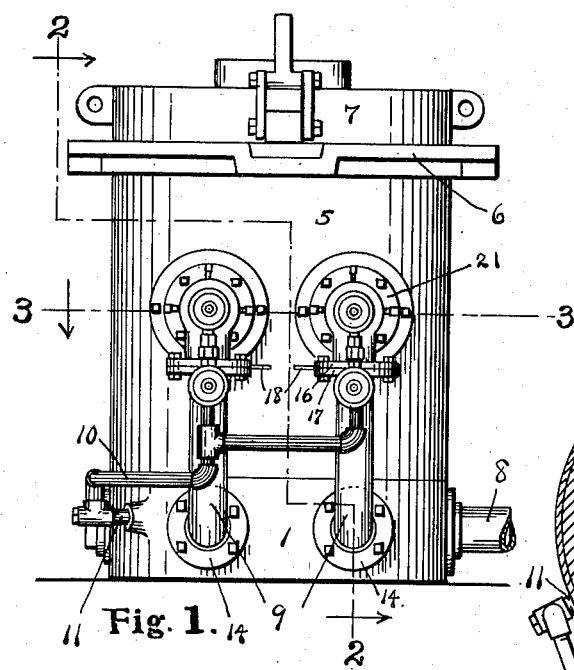
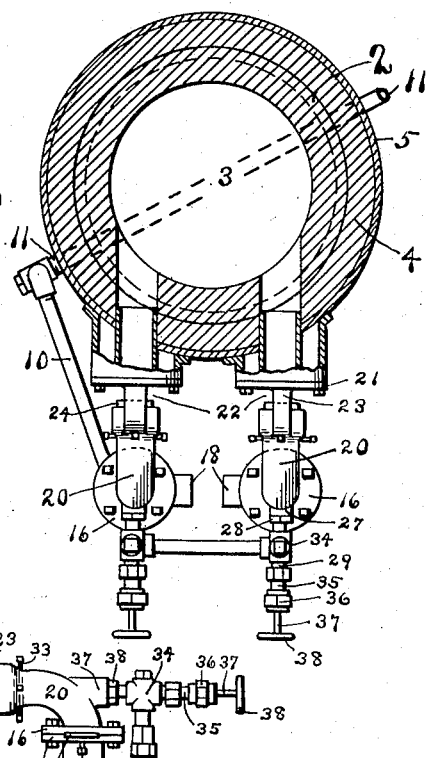
Fig. 3.
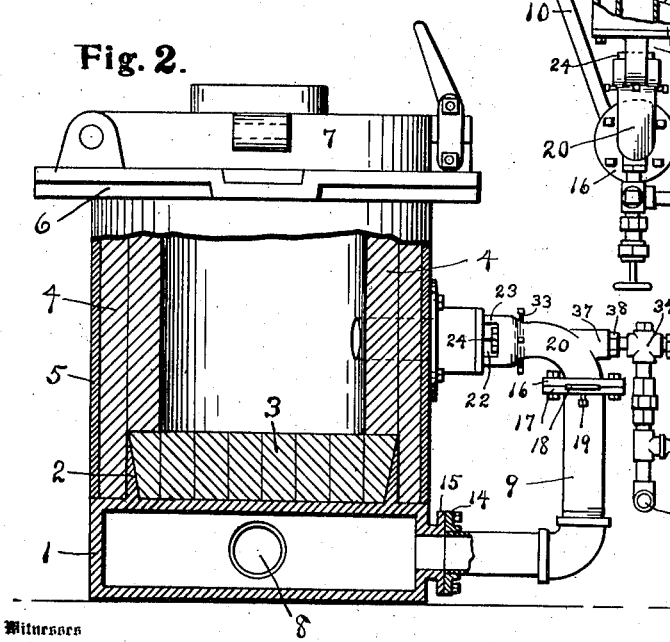
Fig. 2.
Witnesses
O. B. Baenziger.
E. M. Brown.
Inventor
John H. Koons.
By Edward N. Pagelsen.
Attorney.

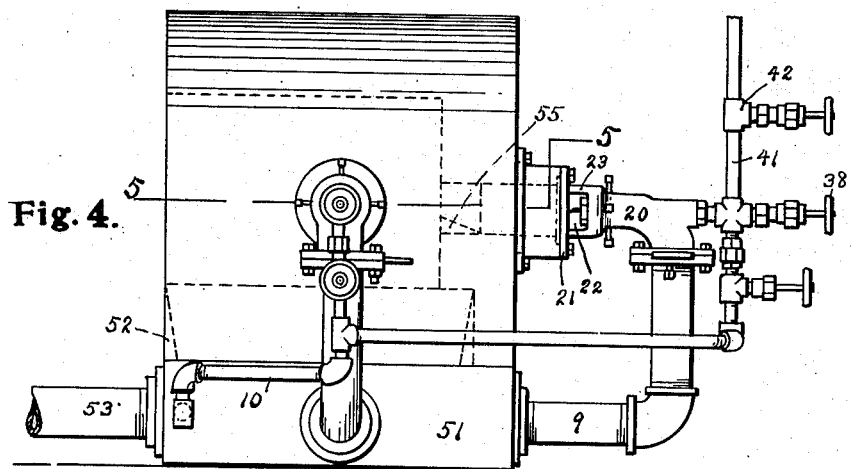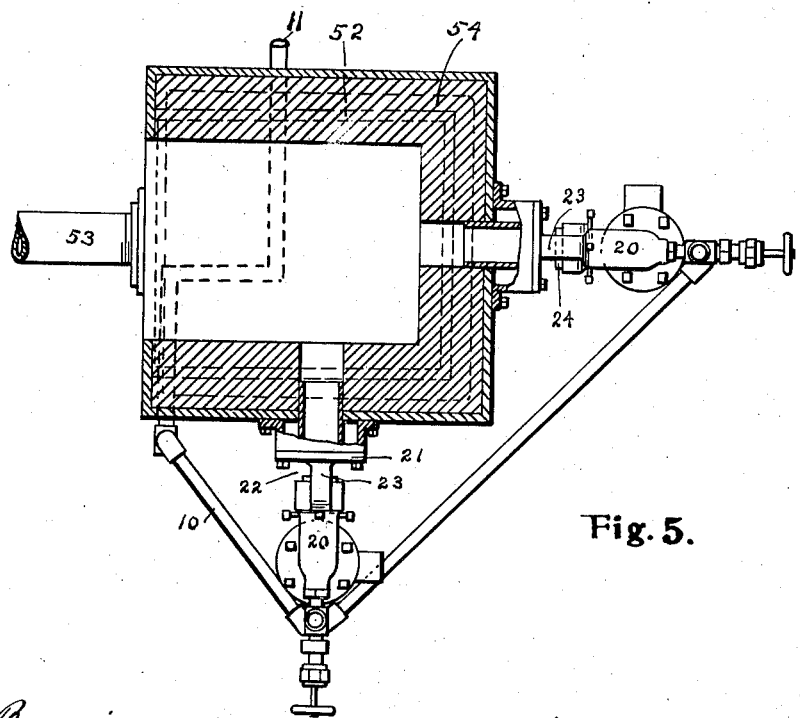

J. H. KOONS.
FURNACE.
APPLICATION FILED FEB. 5, 1910.

980,424.

Patented Jan. 3, 1911.

3 SHEETS—SHEET 3.

Witnesses
O. B. Baenziger.
E. M. Brown.

Inventor
John H. Koons.
By Edward N. Pagelsen,
Attorney

UNITED STATES PATENT OFFICE.

JOHN H. KOONS, OF ANDERSON, INDIANA.

FURNACE.

980,424.  Specification of Letters Patent.  Patented Jan. 3, 1911.

Application filed February 5, 1910. Serial No. 542,199.

*To all whom it may concern:*

Be it known that I, JOHN H. KOONS, a citizen of the United States, residing at Anderson, in the county of Madison and State of Indiana, have invented a new and useful Furnace, of which the following is a specification.

This invention relates to furnaces for heating metal for forging and for casting, and the object of my improvements is to provide means whereby the maximum efficiency of the fuel is obtained.

Figure 6:
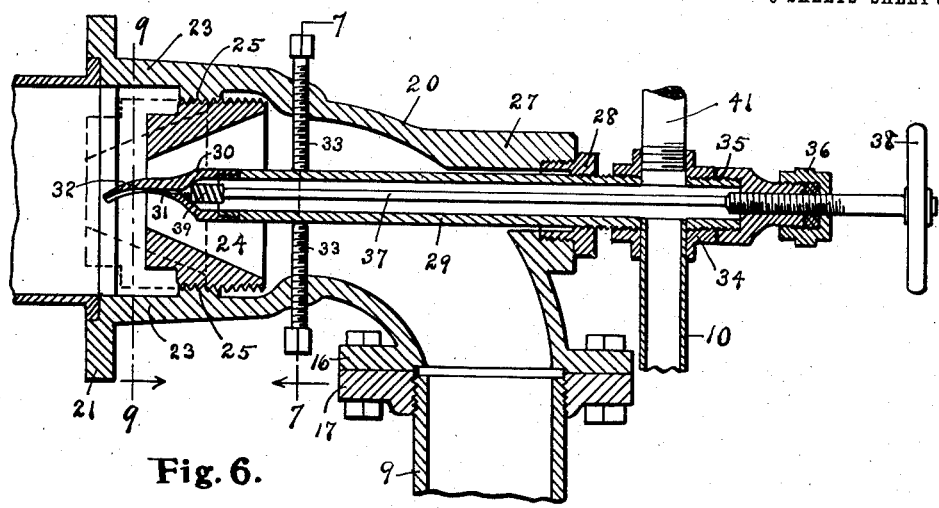
Figure 7:
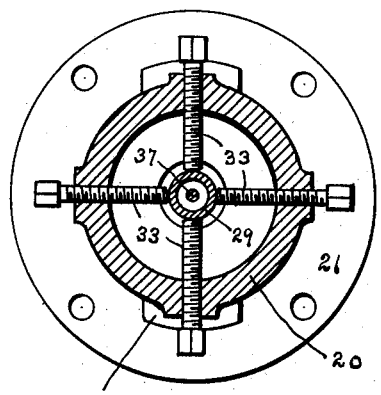
Figure 8:
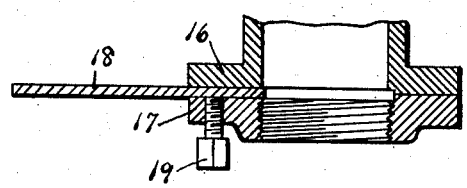
Figure 10:
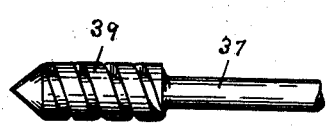
Figure 9:
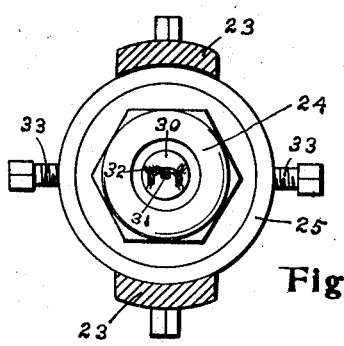

In the accompanying drawings, Figure 1 is an elevation of a melting furnace. Fig. 2 is a cross-section on the line 2—2 of Fig. 1. Fig. 3 is a cross-section on the line 3—3 of Fig. 1. Fig. 4 is a side elevation of a furnace for heating metal for forging. Fig. 5 is a cross section on the line 5—5 of Fig. 4. Fig. 6 is a central cross section of a burner. Fig. 7 is a cross section on the line 7—7 of Fig. 6. Fig. 8 is a cross sectional detail of an air pipe. Fig. 9 is a cross section on the line 9—9 of Fig. 6. Fig. 10 is a detail of the burner valve.

Similar reference characters refer to like parts throughout the several views.

My invention can be embodied in furnaces of any desired type, but only two styles are shown. One is a cylindrical open-top melting furnace and the other is a rectangular open-front furnace adapted to heat iron and steel for forging purposes. It will be understood however that the form and dimensions of the heating-chamber forms no part of this present invention.

Referring now to Figs. 1, 2 and 3 which show a furnace having a heating-chamber especially adapted for melting brass in crucibles, 1 is a hollow base having an upwardly extending flange 2. A bottom 3 and body 4 of fire-brick or other refractory material are built up within the metal shell 5. A cap 6 is secured to the metal shell and a hinged cover 7 closes the main opening in the cap, vent openings being formed in the cap in the usual manner. The hollow base has connected to it an air-intake pipe 8 extending from a fan or blower, and also the air-blast pipes 9 extending to the burners. As part of the internal heat will be communicated to the base, the air within the base will become heated, so that this heat will not be lost. The fuel-oil is fed to the burners through the pipe 10, and this may connect to the pipe 11 passing through the base whereby the oil will also be heated.

The air which has been heated in the base leaves it through pipes 9 having flanges 14 connecting to the flanges 15 on the base. These pipes also connect to the flanges 16 of the burner body by means of a flange 17. Between these flanges 16 and 17 are slidable the gates 18 which may be locked in any desired position, to control the amount of air admitted, by means of the screws 19. See Fig. 8.

Figs. 6 to 10 inclusive show details of the burner. The elbow shaped body 20 has the flanges 16 and 21 at its ends. Near the flange 21 are openings 22, more clearly shown in Figs. 2 and 4, separated by the bridge-pieces 23. Additional air may be drawn in through these openings as is usual in the well known Bunsen burner of which this is a type. The amount of air drawn in is regulated by the adjustable sleeve 24, screwed into a ring 25 in the burner body adjacent the openings 22. The bore of this sleeve is tapering to increase the speed of the air as it passes the oil-discharge opening.

A boss 27 on the body 20 of the burner is threaded to receive the bushing 28, in which is mounted the oil-feed pipe 29. At the inner end of this pipe is secured a nozzle 30 having a discharge opening 31 and a trough-shaped guide 32 which is adapted to cause the spray of fuel oil to assume the shape of a fan. The pipe 29 may be properly adjusted by means of the screws 33. A fitting 34 is mounted on the outer end of the pipe 29 and is capped by the threaded bearing 35 having a stuffing box and gland 36 at its outer end. The valve rod 37 is mounted in this bearing and has a hand wheel 38 at its outer end and a screw threaded enlargement or valve 39 at its inner end. The fuel pipe 10 connects to one side of the fitting 34 while to the opposite side an air or steam pipe 41 may be connected. The pressure of the air or steam entering through the pipe 41 should be practically the same as that of the fuel, and the amount may be controlled by the valve 42. (Fig. 4).

If desired, two burners may be employed, as shown in Figs. 1, 2 and 3, and these may be placed at any desired height from the bottom of the heating chamber. When at the same height, as shown in these drawings, the blasts of incandescent gas from these burners will meet at the rear of the chamber and be broken up in smaller eddies, filling the chamber with intense heat.

The operation of this furnace is as follows:—The oil having been turned on and ignited, the blower or fan is started and a blast of air passes up the pipe 9 into the burner body 20 and out through the nozzle-sleeve 24, throwing the jet of burning oil into the furnace, the amount of fuel oil being controlled by the hand wheel 38. At the beginning, a small portion of unconsumed fuel oil often falls to the bottom of the heating chamber and sinks through. By forming the ring 2 on the top of the base this oil is prevented from flowing out over the edge of the base, and is held where it will be evaporated later on and be burned in the heating chamber. While the flange 2 may be positioned wherever desired, I prefer to place the same midway of the thickness of the wall of the body 4. The nozzle-sleeve 24 will be adjusted until the proper amount of air is drawn into the heating chamber through the openings 22. The fuel-oil will be given a rotary motion as it emerges from the opening 31 by the spiral 39 causing it to hold up until flattened by the trough 32. When air or steam is introduced into the pipe 29 through the pipe 41, the fuel is caused to emerge in the form of a finer spray, being first thoroughly agitated.

Referring to Figs. 4 and 5, a furnace there shown has a hollow rectangular base 51 formed with an upwardly extending flange 52. The air intake pipe 53 may be connected wherever desired. The furnace proper is shown in the form of a muffle 54 with burners connected to the back and one side, although either may be omitted and the height and positions may be changed as required. To cause the blast of flame to enter the heating chamber at an upward inclination, a small block 55 (Fig. 4) may be placed in the intake openings. The operation of this type of furnace is the same as that of the melting furnace previously described.

Many changes may be made in the details of the construction of the various parts without departing from the spirit of my invention.

Having now explained my construction, what I claim as my invention and desire to secure by Letters Patent is:—

1. In a furnace, the combination of a hollow base and a shell forming the heating chamber, a refractory lining for the same, a pipe for conducting air to the interior of the base, a pipe extending from said base to an opening in the shell, a Bunsen burner in said pipe adjacent the shell, and an upwardly extending flange formed on the base and extending into the refractory lining.

2. In a furnace, the combination of base, a shell extending upward from the same, a refractory lining for said shell forming a heating chamber, a flange extending upward from said base into said refractory lining, and a Bunsen burner extending into an opening in said heating chamber.

In testimony whereof I have signed this specification in the presence of two subscribing witnesses.

JOHN H. KOONS.

Witnesses:
 GEORGE B. EPPERSON,
 JOHN A. RUST.